United States Patent [19]

Merkley

[11] 3,760,025

[45] Sept. 18, 1973

[54] TELOMERIZATION REACTIONS UTILIZING CATALYSTS COMPOSED OF CERTAIN ORGANOMETALLIC COMPLEXES AND TRANSITION METALS OR THEIR COMPOUNDS

[75] Inventor: Joseph H. Merkley, Gastonia, N.C.

[73] Assignee: First National City Bank, New York, N.Y.

[22] Filed: Aug. 31, 1970

[21] Appl. No.: 68,589

[52] U.S. Cl. ......... 260/680 B, 252/429 C, 252/430, 252/431 R, 260/668 B
[51] Int. Cl. ............................................. C07c 3/10
[58] Field of Search ................... 260/669 P, 680 B, 260/683.15 E, 66.8 B

[56] References Cited
UNITED STATES PATENTS

| | | |
|---|---|---|
| 3,356,754 | 12/1967 | Wofford ............................. 260/669 |
| 3,324,191 | 6/1967 | Wofford ............................. 260/669 |
| 3,577,395 | 5/1971 | Lal et al. ........................... 252/431 X |
| 3,329,734 | 7/1967 | Schleimer et al. .................. 260/680 |
| 3,542,899 | 11/1970 | Butte .............................. 260/683.15 |

Primary Examiner—Paul M. Coughlan, Jr.
Attorney—Wallenstein, Spangenberg, Hattis & Strampel

[57] ABSTRACT

Telomerization reactions utilizing catalyst systems composed of (1) liquid hydrocarbon solutions or mixtures of complexes such as those made from (a) n-butylsodium or n-butylpotassium, with (b) alkyllithiums such as n-butyllithium and (2) transition metals or their compounds such as Raney nickel and nickel acetylacetonate give a polybutadiene having a high cis-1,4 content.

27 Claims, No Drawings

TELOMERIZATION REACTIONS UTILIZING CATALYSTS COMPOSED OF CERTAIN ORGANOMETALLIC COMPLEXES AND TRANSITION METALS OR THEIR COMPOUNDS

This invention relates to the production of telomers under certain telomerizing conditions whereby to produce enhanced contents of microstructures of the cis-1,4 type. It has been discovered that this can be accomplished by carrying out telomerization reactions in the presence of catalyst systems composed of liquid hydrocarbon solutions of certain organometallic complexes combined with transition metals or compounds thereof.

In copending application, Ser. No. 3,189, filed on Jan. 15, 1970, there is described the preparation of liquid hydrocarbon solutions of complexes of organolithiums with organometallic compounds in which the metals of said organometallic compounds are one or more taken from the group of sodium, potassium, rubidium and cesium. In the above-mentioned application, it is also disclosed that these solutions of organometallic complexes of Group I metals can be used as catalysts in telomerization reactions to produce low molecular weight liquid and semi-liquid telomers from conjugated dienes in good yields. A novel utility of these catalysts is disclosed which involves their ability to regulate the microstructure of the telomers produced during their use in telomerization reactions. For example, it is shown that telomers produced using only the organolithium constituent of the complex as a catalyst, such as n-butyllithium, possess a high degree of saturated cyclic structures, as depicted below:

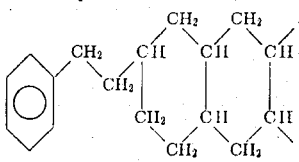

On the other hand, it is there shown that telomers produced using a liquid hydrocarbon solution of a complex containing an organolithium, such as n-butyllithium, and an organopotassium compound, such as n-butylpotassium, as catalyst, possesses a much higher degree of unsaturation, coupled with a relatively low viscosity. Unsaturation is essentially exclusively of the vinyl and trans-1,4 types (little cis-1,4).

It has now been found, in accordance with the present invention, that the addition of small amounts of transition metals or their salts to the aforementioned catalyst complexes generally substantially increases the amount of cis-1,4 content of the resultant telomers. A higher cis-1,4 content of polybutadienes is known to increase their curing rates and lower their viscosity.

The addition of transition metals or their salts to n-butyllithium or n-butylsodium alone does not cause a comparable increase in cis-1,4 content of the telomers.

The types of transition metals or their salts which can be used in the practice of this invention vary widely. In general, metals of Groups VIII b and I b of the Periodic Table can be used, such as nickel, cobalt, iron and copper. Other transition metals which can be used are titanium, vanadium, chromium, manganese, zinc and their compounds. Normally, these are employed, in the practice of the invention, in the form of finely divided powders. "Activated" forms of the metals may be used such as, for example, Raney nickel. In addition, various inorganic and organic salts of the above metals can be employed suc as, for example, nickelous chloride ($NiCl_2$), ferric chloride ($FeCl_3$), cobaltous chloride ($CoCl_2$), cupric chloride ($CuCl_2$) and the acetylacetonate salts, $Ni(C_5H_7O_2)_2$, $Fe(C_5H_7O_2)_3$, $Co(C_5H_7O_2)_3$ and $Cu(C_5H_7O_2)_2$. Other salts of transition metal series can also be used such as nitrates and sulfates, and metal carbonyls and hydrides can also be used, as well as oxinates, glyoximes and salicylates. It is preferable to remove waters of hydration in these salts, if present, prior to their use. These are illustrative examples and are not limitative of the transition metal salts or compounds. Not all of them are equally effective in promoting the formation of cis-1,4 microstructure in the telomers. Thus, nickel acetylacetonate yields a telomer with 30–35 percent cis-1,4 microstructure, while with the much less hydrocarbon-soluble nickel chloride ($NiCl_2$), only about 5 percent cis-1,4 microstructure is obtained. Generally, improved results are obtained with hydrocarbon-soluble transition metal salts or compounds, and especially outstanding in this regard are the acetylacetonate salts of the transition metals. Generally, it is desirable to utilize those transition metals or compounds thereof which produce telomers which have a cis-1,4 content of at least 15 percent and preferably from about 20 to about 35 percent.

As is disclosed in the aforesaid application Ser. No. 3,189, the complexes are particularly advantageously (a) $C_3$–$C_6$ alkyllithium compounds in admixture with (b) $C_3$–$C_6$ alkylmetallic compounds in which the metals of said alkylmetallic compounds are one or more from the group of sodium, potassium, rubidium and cesium, especially the n-butylmetallic compounds. However, in the broader phases of the invention, the organometallic compounds employed in the production of the compositions or complexes or the like utilized in the practice of the present invention, in conjunction with the transition metals or compounds thereof, can comprise $C_2$–$C_{18}$ hydrocarbon organo radicals, said organo radicals being, for instance, cycloalkyl, cycloalkenyl-alkyl, arylalkyl, arylcycloalkyl, cycloalkylaryl, arylcycloalkyl; organo radicals of heterocyclic character, such as 2-pyridyl and 2-thienyl; ethylenically unsaturated organo radicals such as vinyl, allyl and propenyl; polyfunctional organo radicals such as alkylene and polymethylenes as, for example, 1,4-tetramethylene and 1,5-pentamethylene, and those derived by addition of alkali metals and alkyllithiums to conjugated polyene hydrocarbons such as isoprene, 1,3-butadiene and 1,3-divinylbenzene (see, for instance, U. S. Pat. Nos. 3,294,768; 3,388,178 and 3,468,970).

The amounts of these transition metal salts used in the practice of the invention are variable but, in general, such amounts may vary between about 1 mole percent and about 50 mole percent based on the organometallic complex, most efficacious usually being in the range of from about 5 to about 20 mole percent based on the weight of the organometallic complex.

Many of the organometallic complexes or catalyst compositions utilized herein, and described in copending application Ser. No. 3,189, can be represented by the general formula

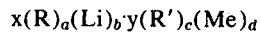

where R and R' are the same or dissimilar $C_2$–$C_{18}$ hydrocarbon organo radicals; Me is one or more metals selected from the group of sodium, potassium, rubidium and cesium; $x$ and $y$ are integers reflecting the molar ratios of the respective organometallic compounds comprising the compositions or complexes, and $a$, $b$, $c$ and $d$ are integers generally from 1 to 3. Illustrative examples of said hydrocarbon organo radicals are n-butyl, sec-butyl, n-amyl, n-dodecyl, cyclopentyl, cyclohexyl, phenyl, tolyl, benzyl, naphthyl, and 2,7-dimethylocta-2,6-dien-1,8-yl. The compositions or complexes can be of binary character, as in the case, for example, be n-butyllithium. n-butylpotassium, or even higher. The compositions or complexes can be employed in the form of solutions thereof in one or more liquid hydrocarbon solvents. Among such solvents are heptane, hexane, cyclohexane, benzene and toluene. These soluble metalorganic complexes will have compositions in which the organolithium to (other) organoalkali molar ratios will vary considerably depending on the nature of the organo radicals involved. Generally, these ratios will vary from about 2:1 to about 10:1, but may be as high as 100:1 or even 1000:1.

It is also desirable in certain instances, in the practice of this invention, to utilize, in the reaction medium in which the telomers of the present invention are produced, Lewis base ethers and aliphatic tertiary amines such as diethyl ether, dimethyl ether of ethylene glycol, tetrahydrofuran, 2-dimethylamino-ethylmethyl ether [(CH$_3$)$_2$—N—CH$_2$—CH$_2$—O—CH$_3$], and N,N,N′,N′-tetramethylethylene diamine [(CH$_3$)$_2$—N—CH$_2$—CH$_2$—N(CH$_3$)$_2$].

The complexes are employed, in conjunction with the transition metals or the compounds of said transition metals, in the form of solution thereof in one or more liquid hydrocarbon solvents except to the extent that the transition metals or certain of the compounds of said transition metals are not soluble in said solvents in which event said metals or compounds thereof will be in suspension or dispersed in said solvents. Among such solvents are, by way of illustration, heptane, hexane, octane, isooctane, cyclohexane, methylcyclohexane, benzene, toluene, xylenes, and compatible mixtures of any two or more thereof. It will be understood of course, that the different complexes and different transition metal compounds will have varying solubilities in different liquid hydrocarbon solvents. However, in general, the complexes will be found to be soluble to a substantial extent in at least most of said liquid hydrocarbon solvents to produce clear solutions and preferred transition metal compounds will likewise be soluble. Where reference is made to solubility or insolubility of a complex in a given liquid hydrocarbon solvent, the term "equivalents" of organometal(s) per liter of solution is used to denote concentration. Thus, by way of illustration, 1 molar equivalent of n-butyllithium dissolved in 1 liter of hexane will dissolve 0.1 molar equivalent of n-butylsodium, while 1.05 molar equivalents of n-butyllithium dissolved in 1 liter of benzene will dissolve 0.35 molar equivalents of n-butylsodium. Alkylpotassiums are generally less readily dissolved.

With regard to the telomerization reactions which are carried out in accordance with the present invention, the telogens which are used are aromatic compounds, especially aromatic hydrocarbon compounds containing at least one hydrogen capable of being replaced by a lithium atom but devoid of any other substituents as, for instance, hydroxyl, chlorine, bromine, iodine, carboxyl, and nitro, which substituents are reactive with the organolithium compositions or complexes which are utilized as catalysts. Illustrative examples of such telogens are benzene, C$_1$–C$_4$ mono-, di- and trialkyl benzenes exemplified by toluene, ethylbenzene, n-propylbenzene, isopropylbenzene, o-, m- and p-xylenes; 1,3,5-trimethyl-benzene; n-, sec- and tert-butylbenzenes; cyclohexylbenzene; alkyl, notably C$_1$–C$_4$, and cycloalkyl substituted polycyclic aromatic compounds exemplified by 1,2,3,4-tetrahydronaphthalene, 1-methylnaphthalene, 1-isopropylnaphthalene, 1,3-isobutylnaphthalene, and 1-cyclohexylnaphthalene; alkoxy-aromatic compounds exemplified by anisole; 1,3-dimethoxybenzene; mono-propoxybenzene; 1-methoxynaphthalene and 1,3-dimethoxynaphthalene; dialkylamino-aromatic compounds, notably those in which the alkyl is C$_1$–C$_4$, exemplified by dimethylaminobenzene; 1,3-bis-(diisopropylaminobenzene) and 1-dimethylaminonaphthalene. Especially satisfactory is toluene.

Illustrative examples of the monomeric conjugated diene and vinyl-substituted aromatic compound taxogens, which may contain from four to 12 carbon atoms, including those disclosed above, are isoprene; 1,3-butadiene; 2-methyl-1,3-butadiene; styrene; alphamethylstyrene; 1,4-divinylbenzene; 1-vinylnaphthalene and 2-vinylnaphthalene. Numerous other examples can also be used, many of which are shown, for instance, in U.S. Pat. No. 3,091,606 which, for this showing, is herewith incorporated by reference.

All of the process advantages described in copending application Ser. No. 3,189 accrue to the practice of this invention as well. Thus, molecular weights of the telomers can be controlled readily to produce liquid products of low, medium, or high viscosity by variation of any one of a number of parameters, such as butadiene or other taxogen feed rate, reaction temperature, telogen concentration, variable lithium to potassium ratio and use of tetramethylethylenediamine (TMEDA) or other similar aliphatic tertiary amine cocatalysts.

The complexes and their manner of use, the telogens and taxogens, and all other aspects of the present invention, except in so far as the utilization of the transition metals or the compounds of said transition metals is concerned, are disclosed in detail in said application Ser. No. 3,189 the disclosures of which, to the extent that all aspects thereof have not been reproduced in the present invention, are incorporated herein by reference.

The following examples are illustrative, but in no way limitative, of the production of telomers in accordance with the present invention.

EXAMPLE I

To 400 ml of toluene was added 0.26g (0.001 moles) of nickel bis-(acetylacetonate), 1.9 g (0.017 moles) of potassium tert-butoxide and 5 ml of TMEDA. To this was added 0.04 moles of n-butyllithium. The mixture was allowed to stir for 5 to 10 minutes to yield the catalyst system BuLi·BuK + Ni(O). Butadiene was then added as a gas at a feed rate of 5.1 liters/min. The temperature rose immediately from ambient to 65°C and was maintained at 65°–70°C with external cooling. After 3.25 hours, 3 ml of water were added to deactivate the catalyst which was still fully active. The toluene was removed under reduced pressure to yield 1,820 g (100 lbs/equivalent of catalyst) of a dark colored fluid (viscosity = 5.7P at 25°C) telomeric oil whose molecular weight was 900 (V.P.O.). The microstructure of the telomeric polybutadiene oil was found to be 34.3% cis-1,4, 22.7% trans-1,4 and 43.1% 1,2(vinyl) by both NMR and IR analysis.

EXAMPLE 2

The procedure of the above Example 1 was carried out using 0.15 g (0.001 moles) of cupric chloride ($CuCl_2$) in place of the nickel acetylacetonate. The yield of telomeric product was 1.3 kg. The microstructure of the product was found to be 20.2 percent cis-1,4, 23.7% trans-1,4 and 56.1% 1,2(vinyl).

EXAMPLE 3

The procedure of Example 1 was followed using as the transition metal about 0.1 g of finely divided Raney nickel. The yield of telomeric product was 1.5 kg. The microstructure of the product was found to be 21.4% cis-1,4, 28.2% trans-1,4 and 50.4% 1,2 (vinyl).

EXAMPLE 4

A larger scale preparation of Example 1 was made in which a higher molecular weight telomer was produced, except that no TMEDA was added to this run.

a. To 4.5 liters of toluene was added 19 g of potassium tert-butoxide, 2.9 g of nickel-bis-acetylacetonate, and 43 ml of concentrated (90 wt percent) n-butyllithium. Butadiene gas was fed into the dark red, rapidly-stirred mixture at a rate of 18 liters/min. while maintaining the reaction temperature at 43°–48°C. After 6 hours, the viscous reaction mixture was quenched with 2 liters of water and then washed 3 times with water. After stripping under vacuum to remove toluene, the residual product, weighing 24.5 pounds was found to have a molecular weight of 2,100 and a viscosity (25°C) of 63 Poise. Its microstructure was 31% cis-1,4, 18.5% trans-1,4 and 50.5 percent 1,2 (vinyl).

b. A comparable run to part (a), but produced with no transition metal salt present, possessed a microstructure with only 3.8% cis-1,4 content (29.9% trans-1,4 and 66.3% vinyl or 1,2). Its molecular weight was 2,600, and its viscosity at 25°C was 66 Poise.

Table I shows the microstructure of butadiene telomers wherein different catalysts are used, and pointing up sharply the increased content of cis-1,4 resulting from the utilization of nickel acetylacetonate in conjunction with a (n-BuLi)·n-BuK catalyst.

TABLE I
MICROSTRUCTURE OF BUTADIENE TELOMERS

| Catalyst Type | % Vinyl | % trans-1,4 | % cis-1,4 | % sat'd |
|---|---|---|---|---|
| n-Butyllithium | 68.9 | 7.6 | 0.0 | 23.5 |
| (n-BuLi)$_2$·n-BuK | 50.1 | 42 | 1 | 8.6 |
| (n-BuLi)·n-BuK | 49.0 | 45.5 | 5.5 | <<1 |
|  | 44.0 | 45.8 | 10.2 | <1 |
| n-BuRb·(n-Bu)$_2$Mg | 58.4 | 32.2 | 9.5 |  |
| (n-BuLi)·n-BuK + 0.16 Ni(Acac)$_2$ | 43.1 | 22.7 | 34.3 | <1 |

Table II shows butadiene telomer microstructures obtained using different transition metals and salts under the same or similar telomerizing conditions. It will be noted that the use of nickel acetylacetonate, particularly, results in the production of exceptionally high cis-1,4 contents in the polybutadiene telomers.

TABLE II

Butadiene Telomer Microstructure

| Transition Metal or Salt | cis-1,4 | trans-1,4 | vinyl |
|---|---|---|---|
| $NiCl_2$ | 4.69 | 29.87 | 65.44 |
| $CoCl_2$ | 16.09 | 28.05 | 55.86 |
| $FeCl_3$ | 18.07 | 27.72 | 54.21 |
| $CuCl_2$ | 20.23 | 23.66 | 56.11 |
| Raney Ni | 21.38 | 28.24 | 50.38 |
| Ni(Acac)$_2$ | 31.0 | 18.5 | 50.5 |
| Ni(Acac)$_2$ | 31.27 | 24.97 | 43.76 |
| Ni(Acac)$_2$ | 34.3 | 22.7 | 43.1 |
| Co(Acac)$_3$ | 13.78 | 31.00 | 55.22 |
| Fe(Acac)$_3$ | 17.90 | 29.00 | 53.10 |
| Cu(Acac)$_2$·H$_2$O | 13.37 | 31.56 | 55.07 |

I claim:

1. In a method of preparing telomers in which the telomers are prepared, in the presence of a catalyst, by a reaction between (a) a telogen in the form of an aromatic compound containing at least one active hydrogen capable of being replaced by a lithium atom but devoid of any other substituents which are reactive with the organolithium compound defined hereafter, with (b) at least one taxogen in the form of a conjugated diene, and wherein there is utilized, as the catalyst, in a hydrogen solvent solution, a complex of at least one organolithium with at least one organometallic compound in which the metal of said organometallic compound is selected from the group of sodium, potassium, rubidium and cesium, the organo radicals of said organolithium and said organometallic compound being $C_2$–$C_{18}$ hydrocarbon radicals, the improvement which comprises carrying out the telomerization reaction in the presence of at least one member selected from the group consisting of transition metals selected from titanium, vanadium, chromium, manganese, zinc, iron, cobalt, nickel, copper and compounds of said metals, said transition metals or hydrocarbon-soluble compounds of said metals being employed in proportions in the range of about 1 to about 50 mole percent based on the organometallic complex.

2. The method of claim 1, in which the hydrocarbon solvent is at least one member of the group of pentane, hexane, heptane, octanes, cyclohexane, cyclooctane, benzene and toluene.

3. The method of claim 1, in which the telogen is toluene and the taxogen is 1,3-butadiene.

4. The method of claim 2, in which the organolithium is a $C_3$–$C_6$ alkyllithium.

5. The method of claim 1, in which the transition metal compound is at least one member of the group of the acetylacetonates of cobalt, nickel, copper and iron.

6. The method of claim 4, in which the transition metal compound is at least one member of the group of the acetylacetonates of cobalt, nickel, copper and iron.

7. The method of claim 4, in which the alkyllithium is n-butyllithium.

8. The method of claim 6, in which the organometallic compound is a member selected from the group of n-butyl-sodium and n-butylpotassium.

9. The method of claim 3, in which the organolithium is n-butyllithium.

10. The method of claim 7, in which the organometallic compound is a member selected from the group of n-butylsodium and n-butylpotassium.

11. The method of claim 6, in which the catalyst complex is a n-butyllithium·n-butylpotassium complex.

12. The method of claim 1, in which the organolithium is a polylithioadduct of a conjugated diene selected from the group of isoprene or 1,3-butadiene, and the organometallic compound is a member selected from the group of n-butylsodium and n-butylpotassium.

13. The method of claim 1, in which the reaction medium includes a Lewis base selected from the group of ethers and aliphatic tertiary amines.

14. In a method of preparing telomers in which the telomers are prepared, in the presence of a catalyst, by a reaction between (a) a telogen in the form of an aromatic compound containing at least one active hydrogen capable of being replaced by a lithium atom but devoid of any other substituents which are reactive with the organolithium compound defined hereafter, with (b) at least one taxogen in the form of a conjugated diene monomer, and wherein there is utilized, as the catalyst, a complex of at least one organolithium with at least one organometallic compound in which the metal of said organometallic compound is selected from the group of sodium, potassium, rubidium and cesium, the organo radicals of said organolithium and said organometallic compound being $C_2$–$C_{18}$ hydrocarbon radicals, the improvement which comprises carrying out the telomerization reaction in the presence of at least one member selected from the group consisting of transition metals selected from titanium, vanadium, chromium, manganese, zinc, iron, cobalt, nickel, copper, and compounds of said metals, said transition metals or hydrocarbon-soluble compounds of said metals being employed in proportions in the range of about 5 to about 20 mole percent based on the organometallic complex.

15. The method of claim 14, in which the telogen is toluene and the taxogen is 1,3-butadiene.

16. The method of claim 14, in which the reaction medium includes a Lewis base selected from the group of ethers and aliphatic tertiary amines.

17. The method of claim 15, in which the reaction medium includes tetramethyl ethylenediamine.

18. The method of claim 14, in which the transition metal compound is at least one member of the group of acetylacetonates of cobalt, nickel, copper and iron.

19. The method of claim 16, in which the transition metal compound is nickel acetylacetonate.

20. In a method of preparing telomers which comprises providing (a) a telogen in the form of an aromatic compound containing at least one active hydrogen capable of being replaced by a lithium atom but devoid of any other substituents which are reactive with the organolithium compound defined hereafter, (b) a complex of at least one organolithium with at least one organometallic compound in which the metal of said organometallic compound is selected from the group of sodium, potassium, rubidium and cesium, the organo radicals of said organolithium and said organometallic compound being $C_2$–$C_{18}$ hydrocarbon radicals, said complex being in solution in a hydrocarbon, and (c) at least one member selected from the group consisting of transition metals selected from titanium, vanadium, chromium, manganese, zinc, iron, cobalt, nickel, copper and compounds of said metals, said transition metals or compounds of said metals being employed in proportions in the range of about 1 to about 50 mole percent based on the organometallic complex, and then gradually adding to reaction mixture at least one taxogen in the form of a conjugated diene monomer.

21. The method of claim 20, in which the telogen is toluene and the taxogen is 1,3-butadiene.

22. The method of claim 21, in which the organolithium is a $C_3$–$C_6$ alkyllithium.

23. The method of claim 22, in which the transition metal compound is nickel acetylacetonate.

24. The method of claim 23, in which the organometallic compound is a member selected from the group of n-butylsodium and n-butylpotassium.

25. In a method of preparing telomers which comprises providing a reaction mixture containing (a) a telogen in the form of an aromatic compound containing at least one active hydrogen capable of being replaced by a lithium atom but devoid of any other substituents which are reactive with the organolithium compound defined hereafter, (b) a complex of at least one organolithium with at least one organometallic compound in which the metal of said organometallic compound is selected from the group of sodium, potassium, rubidium and cesium, the organo radicals of said organolithium and said organometallic compound being $C_2$–$C_{18}$ hydrocarbon radicals, and (c) at least one member selected from the group consisting of transition metals selected from titanium, vanadium, chromium, manganese, zinc, iron, cobalt, nickel, copper and compounds of said metals, said transition metals or hydrocarbon-soluble compounds of said metals being employed in proportions in the range of about 1 to about 50 mole percent based on the organometallic complex, and then gradually adding to reaction mixture at least one taxogen in the form of a conjugated diene monomer.

26. The method of claim 25, in which the telogen is toluene and the taxogen is 1,3-butadiene.

27. The method of claim 26, in which the transition metal compound is nickel acetylacetonate.

* * * * *